United States Patent [19]
Kishimoto et al.

[11] Patent Number: 5,734,100
[45] Date of Patent: Mar. 31, 1998

[54] DEVICE FOR DIAGNOSING MISFIRING OF A MULTI CYLINDER ENGINE

[75] Inventors: Youichi Kishimoto, Chigasaki; Toshio Takahata, Kanagawa, both of Japan

[73] Assignee: Nissan Motor Co., Ltd., Kanagawa, Japan

[21] Appl. No.: 678,740

[22] Filed: Jul. 11, 1996

[30] Foreign Application Priority Data

Jul. 13, 1995 [JP] Japan .................... 7-177603

[51] Int. Cl.$^6$ .................................. G01M 15/00
[52] U.S. Cl. .................. 73/117.3; 73/116; 123/419; 123/436; 364/431.07; 364/431.08
[58] Field of Search ........................ 73/116, 117.2, 73/117.3; 123/419, 436; 364/431.07, 431.08

[56] References Cited

U.S. PATENT DOCUMENTS

| | | | |
|---|---|---|---|
| 5,041,979 | 8/1991 | Hirka et al. | 73/116 |
| 5,117,681 | 6/1992 | Dosdall et al. | 73/116 |
| 5,197,325 | 3/1993 | Tamura et al. | 73/117.3 |
| 5,426,587 | 6/1995 | Imai et al. | 364/431.07 |
| 5,452,604 | 9/1995 | Namiki et al. | 73/116 |
| 5,567,873 | 10/1996 | Toyoda | 123/419 |

FOREIGN PATENT DOCUMENTS 2-188649 7/1990 Japan.
4-209950 7/1992 Japan.

*Primary Examiner*—George M. Dombroske
*Attorney, Agent, or Firm*—Lowe, Price, LeBlanc & Becker

[57] ABSTRACT

A mechanism is provided for outputting reference signals in synchronism with the firing action of the cylinders of a multi cylinder engine. Correction coefficients are calculated for correcting deviations in the periods between the cylinders from the periods of the reference signals which are obtained during the fuel cut off state. The periods of the reference signals for each cylinder are corrected according to these correction coefficients, and the presence or absence of misfiring for each cylinder is determined from the corrected periods. On the one hand the determination of misfiring is prevented when input of external interference to the engine is present, and on the other hand the learning of the correction coefficients is prevented when instability has occurred in the reference signals during the fuel cut off state. Since the learning of the correction coefficients is prevented in different circumstances from those in which the determination of misfiring is prevented, the learning accuracy for the correction coefficients is elevated.

5 Claims, 5 Drawing Sheets

DEVICE FOR DIAGNOSING MISFIRING OF A MULTI CYLINDER ENGINE

FIELD OF THE INVENTION

The present invention relates to the diagnosis of misfiring of a multi cylinder engine.

BACKGROUND OF THE INVENTION

Determination of whether or not misfiring is occurring for each cylinder of a multi cylinder four stroke cycle engine for an automobile may for example be performed as follows.

Every time the crankshaft rotates through 720°, a reference signal for each cylinder in the firing order is detected using a crank angle sensor, and, for each cylinder, if the deviation in the frequency of the reference signal for this cylinder becomes greater than a predetermined value, it is determined that misfiring has occurred in that cylinder. The crank angle sensor is a sensor which is linked to the engine crankshaft and detects the rotational position of the crankshaft.

Various concepts have been disclosed in order to increase the accuracy of this misfiring detection procedure. For example, in the device described in Tokkai Hei 4-209950 published by the Japanese Patent Office in 1992, a mechanism for detecting the input of external interference is provided, and when external interference is detected the diagnosis of misfiring is prevented. By "external interference" is meant change etc. of the driving resistance due to irregularities of the road surface or to braking action which is transmitted to the engine from the driving road wheels, and which exerts an influence upon the revolution speed of the engine.

Further, in Tokkai Hei 2-188649 published by the Japanese Patent Office in 1990, In order to correct for deviations In the accuracy of the crank angle signals the crank angle sensor output, there is disclosed the concept of sampling the crank angle signals in the state in which fuel supply to the engine is cut off, and of learning from the signal period for each cylinder which Is thus sampled an individual correction coefficient for each of the cylinders, so that these correction coefficients can be used for correction of deviations in the signal accuracy between the various cylinders. By correcting the timing of the reference signals for each of the cylinders in the state in which fuel for the engine is being supplied using these correction coefficients for each of the cylinders which have thus been learnt during the fuel cut off state, the influence of deviations in the accuracy of angular detection by the crank angle sensor Itself can be eliminated from the misfiring detection procedure.

However, changes in the engine revolution speed due to external interference may occur even in the fuel cut off state, and there is a danger that the accuracy of learning may be deteriorated if learning is performed according to the above described sampling procedure under such conditions.

SUMMARY OF THE INVENTION

It is therefore an object of this invention to increase the accuracy of the learning procedure for the aforesaid correction coefficients of crank angle signals.

It is a further object of this invention to increase the accuracy of the misfiring detection.

In order to achieve the above objects, this invention provides a device for diagnosing misfiring of an engine which has multi cylinders. The device comprises a mechanism for outputting a reference signal for each cylinder in synchronous with the firing action of the each cylinder; a mechanism for calculating the time period of the reference signal for the each cylinder; a mechanism for determining whether the engine is in a fuel supplied state or a fuel cut off state; a mechanism for learning a correction coefficient for the each cylinder for correcting deviations in the periods between the cylinders, based upon the period of the reference signal for the each cylinder which is obtained during the fuel cut off state; a mechanism for correcting the period of the reference signal for the each cylinder during the fuel supplied state of the engine according to the correction coefficient; a mechanism for determining whether or not misfiring is occurring for the each cylinder, based upon the corrected period; a mechanism for preventing the misfiring determining mechanism from determining a misfiring, when input of external interference to the engine has been detected; and a mechanism for preventing the learning mechanism from learning the correction coefficient for the each cylinder, when instability has occurred in the period of the reference signal during the fuel cut off state.

It is preferable that the learning mechanism comprises a mechanism for calculating the correction coefficient from the period of the reference signal, a mechanism for calculating an average value of a series of the correction coefficients during the fuel cut off state, and a mechanism for updating a correction coefficient which has been previously stored based upon the average value.

It is further preferable that the learning preventing mechanism comprises a mechanism for preventing the correction coefficient calculating mechanism from calculating the correction coefficient in a predetermined circumstance.

It is still further preferable that the learning preventing mechanism further comprises a mechanism for preventing the updating mechanism from updating the correction coefficient in a circumstance which differs from the predetermined circumstance.

The details as well as other features and advantages of this invention are set forth in the remainder of the specification and are shown in the accompanying

DESCRIPTION OF THE PREFERRED EMBODIMENTS

Figure 1:
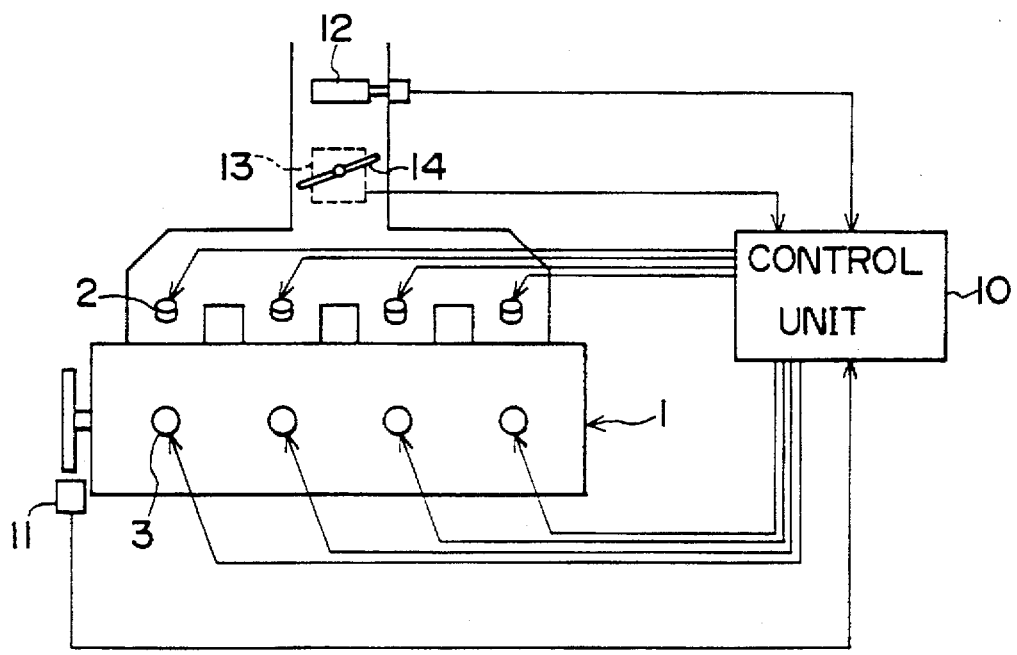
FIG. 1 is a schematic diagram of a misfiring diagnosis device according to this invention.

Referring to FIG. 1 of the drawings, a four cylinder four-stroke cycle engine 1 for an automobile comprises cylinders #1 through #4 not individually shown in the figure, and each cylinder is provided with a fuel injection valve 2 and a spark plug 3.

The injection of fuel to each cylinder and the ignition of this fuel are controlled according to signals which are output from a control unit 10 to each of the fuel injection valves 2 and to each of the spark plug 3.

A crank angle sensor 11, an air flow sensor 12, and an idle switch 13 are provided to the engine 1, and the output signals of these sensor devices are input to the control unit 10.

The control unit 10 comprises a microcomputer which inputs the signals from various sensors including the above, and which controls fuel injection and ignition timing based thereupon. Various other switches not shown in the figure are also provided to the vehicle, including a neutral switch which detects when the transmission is shifted to neutral, a power steering switch which detects operation of the power steering, an air conditioner switch which detects operation of the air conditioner, etc..

The crank angle sensor 11 outputs a reference signal each time the crankshaft of the vehicle rotates through 180°, and outputs a unit signal every 1° or 2°. The control unit 10 detects the crank angle and the revolution speed N of the engine from these signals. A cylinder discrimination signal is included in the reference signal, and this discrimination signal makes it possible to tell the cylinders apart: for example, the pulse width of the reference signal for cylinder #1 may be arranged to be greater than the pulse widths of the reference signals for the other cylinders. Herein, it will be hypothesized that cylinder #1 is the reference cylinder with respect to which it is required to learn a relative correction coefficient for each of the other cylinders.

The air flow meter 12 detects the flowrate Q of intake air to the engine 1. The air flow meter 12 utilizes for example a heated wire.

The idle switch 13 outputs an ON signal when it detects that a throttle 14 of the engine 1 is in the fully closed condition.

Apart from these, the neutral switch, the power steering switch, and the air conditioner switch not shown in the figures are fitted to the vehicle.

The control unit 10 calculates a basic fuel injection amount $$Tp = \frac{K \cdot Q}{N},$$

where K is a constant, based upon the air flowrate Q and the engine revolution speed N. And then various types of correction are performed upon the basic fuel injection amount Tp, so as to yield a final fuel injection amount Ti=Tp·COEF, where COEF is determined according to these various corrections; and signals of pulse width corresponding to Ti are output to the fuel injection valves 2 at appropriate timings which are synchronized with the rotation of the engine crankshaft.

Further, during deceleration of the vehicle when the speed is diminishing, if the conditions that the idle switch 13 is ON and that the engine revolution speed is higher than a predetermined value are satisfied, then the output of the pulse signals to the fuel injection valves 2 is interrupted, and accordingly the supply of fuel is cut off. This fuel cut off state is canceled either when the engine revolution speed N drops below the predetermined value or when the idle switch 13 goes OFF.

Yet further, the control unit 10 determines upon an ignition timing for the injected fuel based upon the engine revolution speed N and the basic fuel injection mount Tp, and supplies pulses of electrical energy according to this determined timing to the spark plug 3 so as to perform spark ignition.

Figure 2:
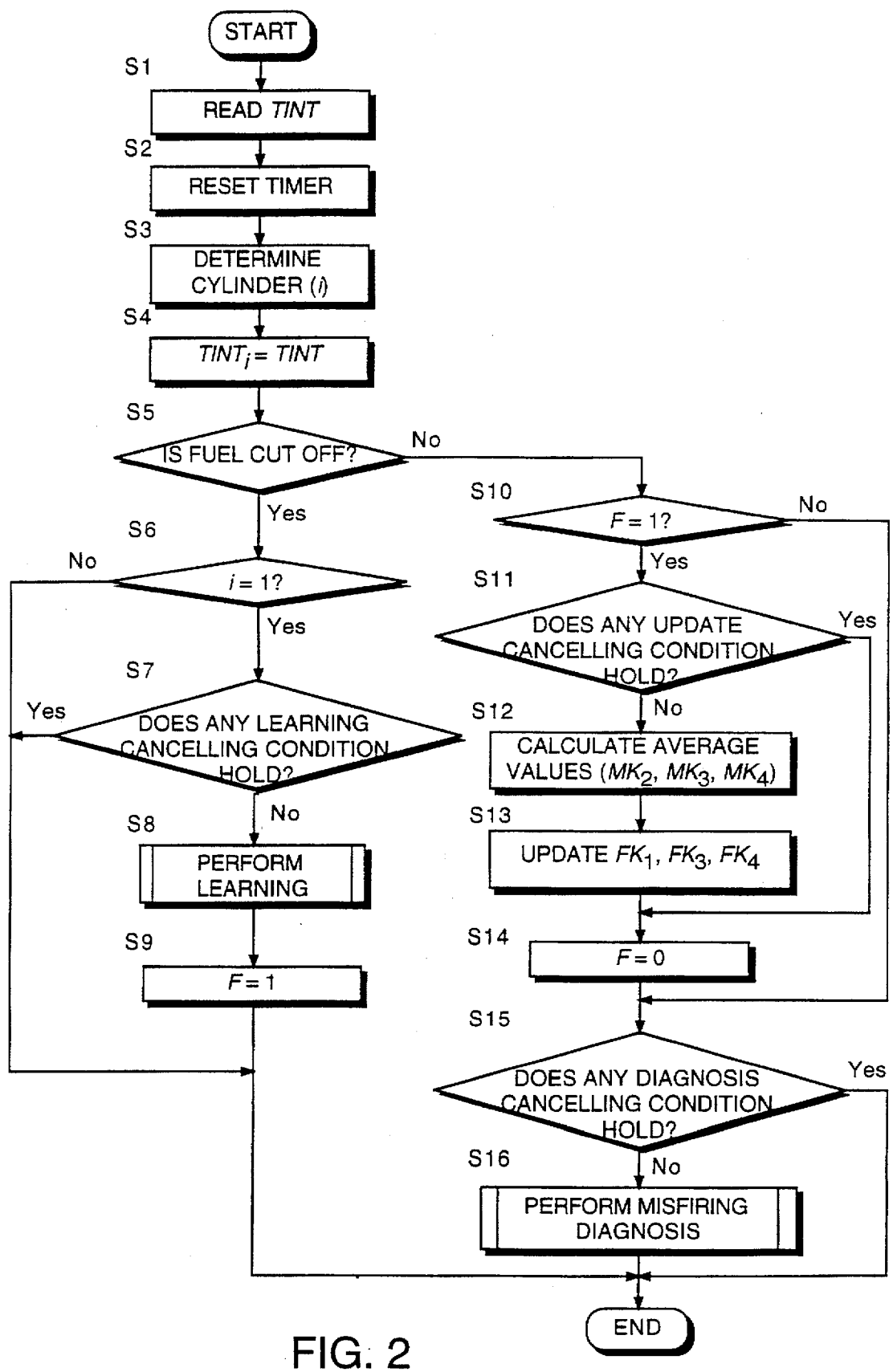
FIG. 2 is a flow chart showing a main routine of misfiring diagnosis according to this invention.
Figure 3:
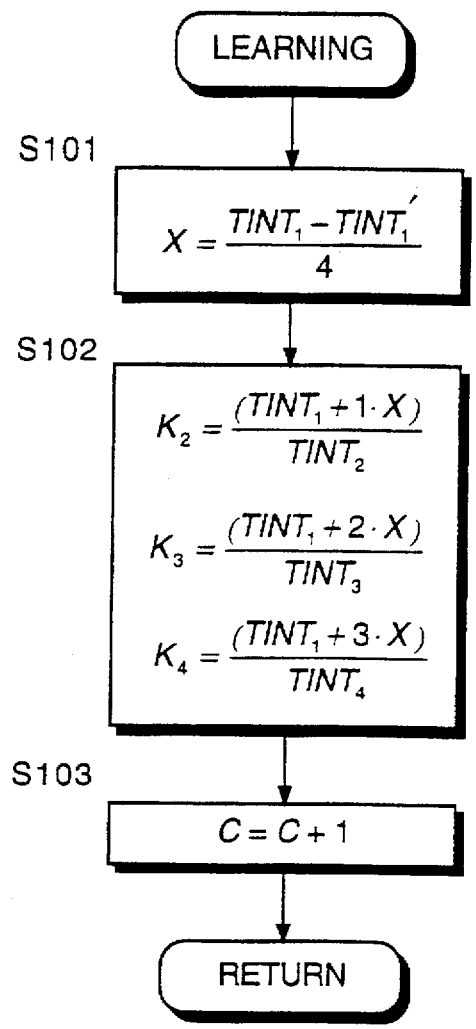
FIG. 3 is a flow chart showing a subroutine of the misfiring diagnosis for learning a correction coefficient for each of engine cylinders.
Figure 4:
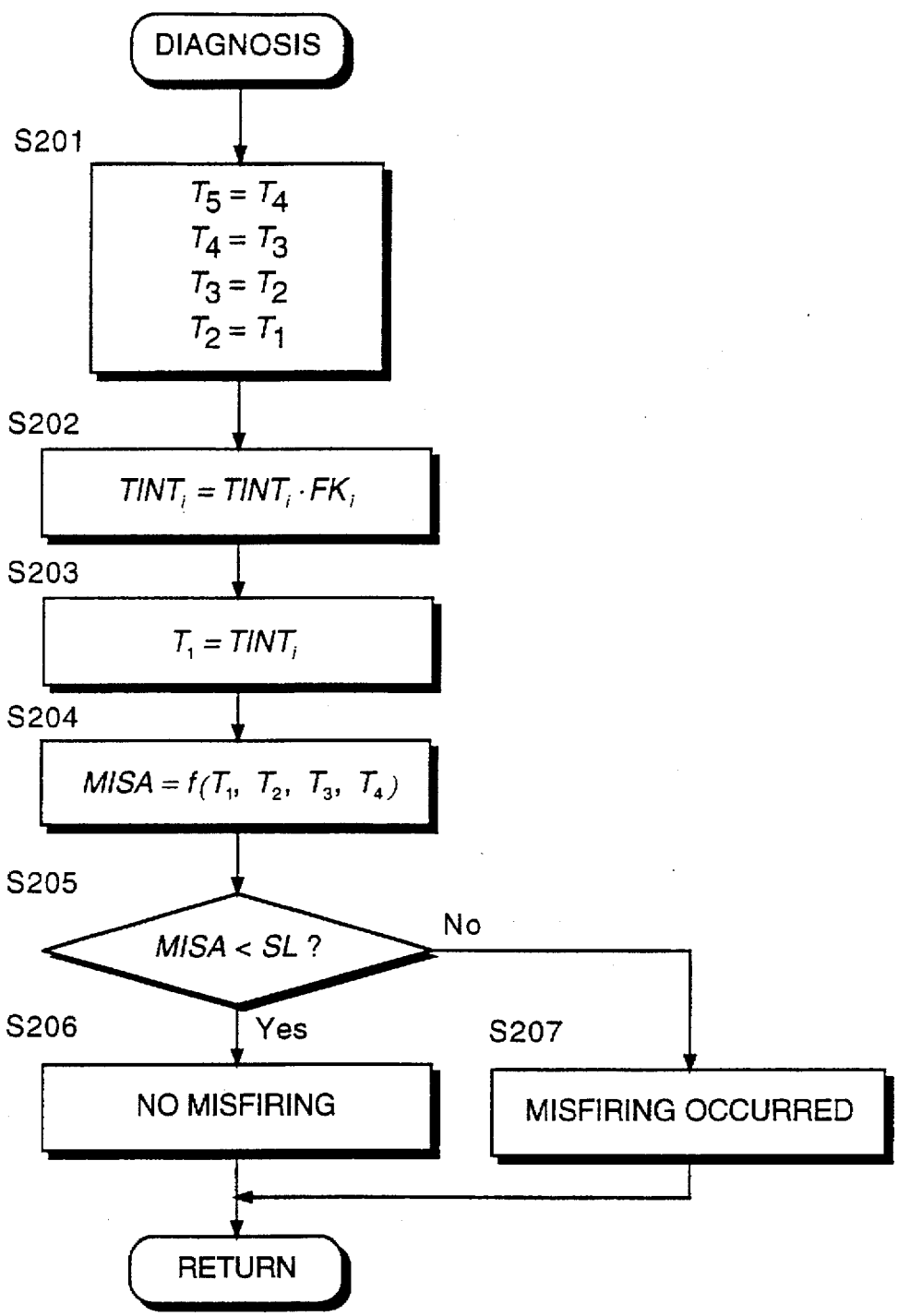
FIG. 4 is a flow chart showing another subroutine of the misfiring diagnosis for diagnosing misfiring.

Furthermore, the control unit 10 executes the programs whose flow charts are shown in FIGS. 2, 3, and 4 in order to determine upon the presence or absence of misfiring for each cylinder of the engine 1, and in specified circumstances issues a warning to the vehicle driver by illuminating a warning lamp or the like.

FIG. 2 is a flow chart of a main routine which is executed synchronously with the reference signals which are output from the crank angle sensor.

In a step S1, the control unit 10 reads in the timed period TINT from an internal timer. This value TINT is the interval of the reference signal obtained by measuring the time elapsed from the previous time that this routine was executed. After this measurement, in a next step S2, the timer is reset to zero.

In a step S3 the control unit 10 determines which cylinder is the current one, according to the method described above. The number of the current cylinder will hereinafter be referred to as i.

In a step S4, the period TINT measured in the step S1 as described above is stored as the period $TINT_i$ of the reference signal for the cylinder #i. In other words, if in the step S3 it has been determined that the current cylinder is cylinder #1, then this value TINT is stored as $TINT_1$; if it has been determined that the current cylinder is cylinder #2, then this value TINT is stored as $TINT_2$; if it has been determined that the current cylinder is cylinder #3, then this value TINT is stored as $TINT_3$; and, if it has been determined that the current cylinder is cylinder #4, then this value TINT is stored as $TINT_4$.

In a step S5, a decision is made as to whether or not the fuel is currently cut off. If in fact the flow of fuel is currently cut off then the flow of control proceeds to a step S6, while if the fuel is not currently cut off then the flow of control is transferred to a step S10.

In the step S6, a decision is made as to whether or not the current cylinder, as determined in the step S3, is the reference cylinder #1 or not, and if in fact the current cylinder is the reference cylinder #1 then the flow of control proceeds to a step S7, while if the current cylinder is not the reference cylinder #1 then this main routine terminates.

In the step S7, a decision is made as to whether or not either of the following conditions for canceling learning is satisfied:

(1) The magnitude relationship of the signal periods of the neighboring cylinders is opposite to the normal one, and moreover there is great deviation in the period. To explain the former condition, when the fuel is cut off while the vehicle is traveling along a normal type of road surface the speed of the vehicle gradually drops, and accordingly the period of the reference signal steadily becomes longer. Accordingly, the period of the reference signal for any cylinder must be smaller than the period of the reference signal for the cylinder which is subsequent in the firing order. This relationship may become reversed due to conditions such as, for example, an irregular road surface.

(2) The sum of a misfiring determination value MISA which will be described hereinafter over a predetermined number of engine revolutions deviates from zero by more than a predetermined amount, which corresponds to the case that the period of each cylinder deviates without changing according to any fixed rule.

Figure 5:
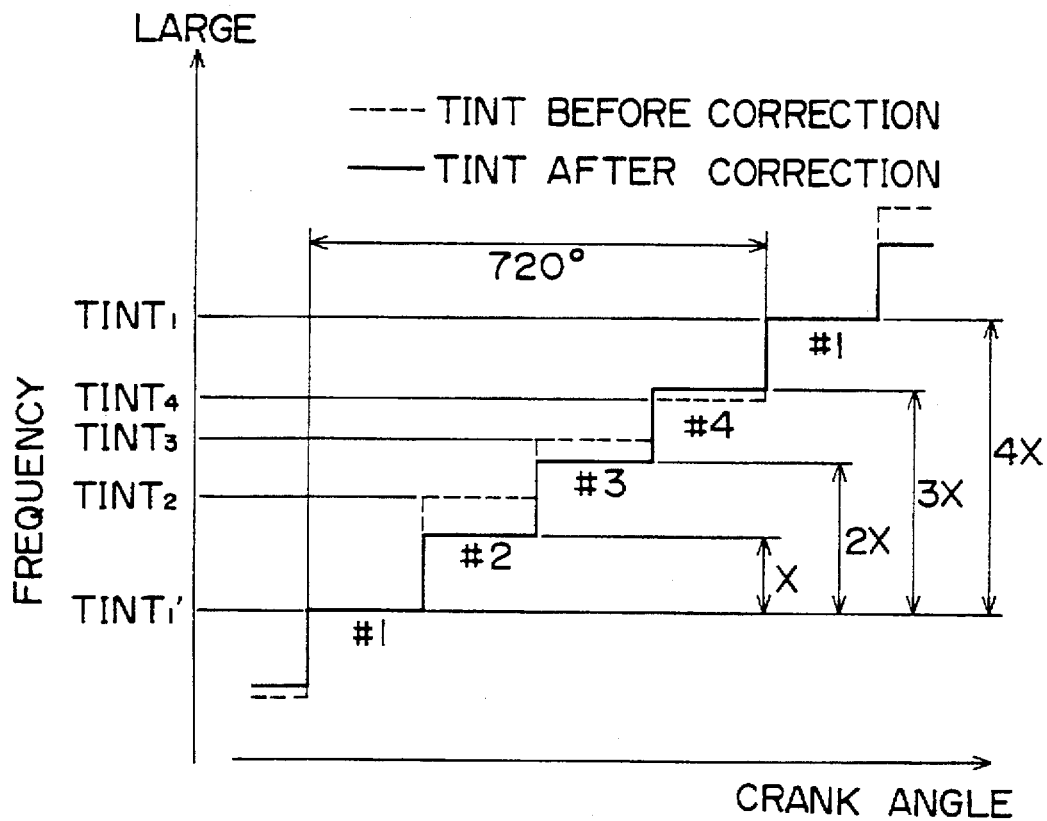
FIG. 5 is a diagram for explanation of the process of correction of reference signals, according to this invention.

Only if neither of the above cancellation conditions is satisfied, then in a step S8 a correction coefficient for each cylinder is learnt according to the subroutine shown in FIG. 3. This subroutine will now be explained. In a first step S101, the amount of change $\Delta INT_1 = TINT_1 - TINT_1'$ of the period of the reference signal for the reference cylinder #1 over a crank angle of 720° is calculated, based upon the measured results for the period during the fuel cut off state, and this value is then divided by the number n=4 of cylinders, so as to arrive at a unit period change value X as shown in FIG. 5:

$$X = \frac{TINT_1 - TINT_1'}{4}$$

In a next step S102, for each of the cylinders (except the first), the ratio between the theoretical period and the period $TINT_i$ (where i=2, 3, or 4) which has actually been measured over said angle of 720° is calculated according to the following equation. These ratios are the correction coefficients for each of the cylinders.

$$K_i = \frac{(TINT_1 + j \cdot X)}{TINT_i}$$

where, j is the number of the cylinder counted from cylinder #1 according to the firing order.

In concrete terms, the correction coefficient for cylinder #2 (according to the firing order) is calculated as:

$$K_2 = \frac{(TINT_1 + 1 \cdot X)}{TINT_2}$$

and the correction coefficient for cylinder #3 (according to the firing order) is calculated as:

$$K_3 = \frac{(TINT_1 + 2 \cdot X)}{TINT_3}$$

and the correction coefficient for cylinder #4 (according to the firing order) is calculated as:

$$K_4 = \frac{(TINT_1 + 3 \cdot X)}{TINT_4}$$

Since cylinder #1 is the reference cylinder, its correction coefficient $K_1 = 1$.

The correction coefficients $K_2$, $K_3$, and $K_4$ which have thus been calculated for each cylinder are stored in the memory of the control unit 10.

Finally, in a step S103, the value C of a counter is incremented by 1 each time the correction coefficients $K_2$, $K_3$, and $K_4$ for each of the cylinders are stored, and then the operation of this subroutine terminates.

After the completion of this subroutine, the flow of control returns to a step S9 of the main program whose flow chart is shown in FIG. 2, in which the value of a learn flag F is set to unity, and then the operation of this main routine terminates.

If on the other hand the result of the decision in the step S5 is that the fuel is not currently cut off, then the flow of control is transferred to the step S10, in which a decision is made as to whether or not the learn flag F is currently set to unity. If the value of the learn flag F is currently unity, then the fuel cut off state has just terminated as described above, and the flow of control proceeds to a step S11; while, if the value of the flag F is already zero, then the flow of control skips to a step S15.

In this step S11, a decisione is made as to whether or not any one of the following update cancellation conditions, which mean that the update of the correction coefficient should be canceled, holds:

(1) During fuel cut off, either the neutral switch, the power steering switch, or the air conditioner switch was switched over;

(2) The misfiring determination value MISA, to be described hereinafter, is smaller than a predetermined value, or has become negative;

(3) The difference between the maximum and the minimum value of any one of the correction values $K_2$, $K_3$, or $K_4$ for the various cylinders that was obtained during a single episode of fuel cut off is greater than a predetermined value.

If none of the above described update cancellation conditions holds then the flow of control proceeds to a step S12, while if one (or more) of the above conditions holds then the flow of control skips to a step S14.

In the step S12, the average values $MK_2$, $MK_3$, and $MK_4$ of the correction coefficients $K_2$, $K_3$, and $K_4$ for each of the cylinders which were calculated several times during fuel cut off are calculated according to the following equations:

$$MK_2 = \frac{\Sigma K_2}{C}$$

$$MK_3 = \frac{\Sigma K_3}{C}$$

$$MK_4 = \frac{\Sigma K_4}{C}$$

where C is the count value described above.

To continue: in a next step S13, based upon these average values $MK_2$, $MK_3$, and $MK_4$ which have been calculated, the #2, #3, and #4 correction coefficients $FK_2$, $FK_3$, and $FK_4$ which are used for the determination of misfiring are updated according to the following equations, and are again stored in the memory:

$$FK_2 = \left(\frac{1}{a}\right) \cdot MK_2 + \left(1 - \frac{1}{a}\right) \cdot FK_2$$

$$FK_3 = \left(\frac{1}{a}\right) \cdot MK_3 + \left(1 - \frac{1}{a}\right) \cdot FK_3$$

$$FK_4 = \left(\frac{1}{a}\right) \cdot MK_4 + \left(1 - \frac{1}{a}\right) \cdot FK_4$$

where 1/a is a weighting constant for averaging.

Since cylinder #1 is the reference cylinder, $FK_1$ is taken as 1.

In the next step S14, the value of the learn flag F is reset to zero. Further, the memory location of the control unit 10 in which the correction coefficients $K_2$, $K_3$, and $K_4$ for the cylinders are stored, and the count value C are cleared, in order to prepare for the next learning episode.

In the next step S15, a decision is made as to whether or not a condition in which the diagnosis of misfiring should be canceled holds. This condition means that input of external interference from the drive wheels of the vehicle to the engine has been detected. In concrete terms, first the amount of change $\Delta TINT_i = TINT_i - TINT_{i-1}$ of the period for the most recent cylinder in the firing order is calculated. Based upon this, a reference value $A = f(\Delta TINT_i)$ is calculated. And, if the amount $\Delta VSP$ of change of the vehicle speed VSP has exceeded this reference value A, It is decided that the condition for canceling diagnosis of misfiring holds.

In a step S16, misfiring diagnosis is performed according to the subroutine whose flow chart is shown in FIG. 4. The operation of this subroutine will now be explained. The diagnosis of misfiring is performed using five values from $T_1$ through $T_5$, which are the five most recent values of the reference signal period.

In order to do this, in a first step S201, the data used for the five previous episodes of misfiring diagnosis are interchanged in the following manner (data with lower subscripts are newer):

$$T_5 = T_4, \ T_4 = T_3, \ T_3 = T_2, \ T_2 = T_1$$

In a step S202, the most recent value for the period $TINT_i$ is corrected using the correction coefficient $FK_i$ for the relevant cylinder, thus:

$$TINT_i = TINT_i \cdot FK_i$$

And in a next step S203 this corrected period $TINT_i$ substituted into the value $T_1$.

In a next step S204, the misfiring determination value MISA, mentioned above, is calculated according to the following equation:

$$MISA = \frac{\{3 \cdot (T_4 - T_5) + (T_4 - T_1)\}}{T_5{}^3}$$

In a next step S205, the misfiring determination value MISA is compared with a reference value SL, and if MISA<SL then the flow of control proceeds to a step S206 and the determination is made that misfiring is not occurring. However, if MISA>SL, then the flow of control proceeds to a step S207 and the determination is made that misfiring is occurring. The reference value SL is set according to engine operational conditions.

In this manner, not only is determination of misfiring prohibited when external interference is input from the driving wheels to the engine, but also is the learning of the correction coefficients for each of the cylinders prevented if the period of the reference signal exhibits irregularity during the fuel cut off condition. It is therefore possible to increase the accuracy of misfiring detection as well as the accuracy of learning.

Further, since the correction coefficients for each of the cylinders are calculated respectively according to the reference signals occur during the fuel cut off condition, and these correction coefficients for each of the cylinders are corrected based upon their average values after the fuel cut off episode has concluded, therefore the correction coefficients are obtained with high accuracy.

Yet further, since the calculation of the correction coefficients for each of the cylinders is permitted or is prohibited for each particular time the reference signal is output, accordingly the opportunity for learning is increased as compared with the case in which they are all prohibited or permitted in the same manner, and accordingly the accuracy of learning is improved.

Yet further, since the prohibition of the calculation of the correction coefficient for each individual cylinder during the fuel cut off state and the prohibition of the updating of each correction coefficient after fuel cut off has been completed are both controlled individually, accordingly the accuracy of learning is further improved.

The embodiments of this invention in which an exclusive property or privilege is claimed are defined as follows:

1. A device for diagnosing misfiring of an engine which has multi cylinders, comprising:

means for outputting a reference signal for each cylinder synchronous with the firing action of each said cylinder;

means for calculating the time period of said reference signal for each said cylinder;

means for determining whether said engine is in a fuel supplied state or a fuel cut off state;

means for learning a correction coefficient for each said cylinder for correcting deviations in said periods between said cylinders, based upon the period of said reference signal for each said cylinder which is obtained during the fuel cut off state;

means for correcting the period of said reference signal for each said cylinder during the fuel supplied state of said engine according to said correction coefficient;

means for determining whether or not misfiring is occurring for each said cylinder, based upon said corrected period;

means for preventing said misfiring determining means from determining a misfiring, when input of external interference to said engine has been detected;

means for determining if instability has occurred in said period of said reference signal during the fuel cut off period; and means for preventing said learning means from learning said correction coefficient when said instability has occurred.

2. A device for diagnosing misfiring of an engine which has a plurality of cylinders, comprising:

means for outputting a reference signal for each cylinder synchronous with the firing action of each said cylinder;

means for calculating the time period of said reference signal for each said cylinder;

means for determining whether the engine is in a fuel supplied state or a fuel cut off state;

means for learning a correction coefficient for each said cylinder for correcting deviations in said periods between said cylinders, based upon the period of said reference signal for each said cylinder which is obtained during the fuel cut off state;

means for correcting the period of said reference signal for each said cylinder during the fuel supplied state of said engine according to said correction coefficient;

means for determining whether or not misfiring is occurring for each said cylinder, based upon said corrected period;

means for preventing said misfiring determining means from determining a misfiring, when input of external interference to said engine has been detected; and means for preventing said learning means from learning said correction coefficient for each said cylinder, when instability has occurred in said period of said reference signal during the fuel cut off state, wherein said learning means comprises means for calculating said correction coefficient from said period of said reference signal, means for calculating an average value of a series of said correction coefficients during the fuel cut off state, and means for updating a correction coefficient which has been previously stored based upon said average value.

3. A device for diagnosing misfiring according to claim 2, wherein said learning preventing means comprises means for preventing said correction coefficient calculating means from calculating said correction coefficient in a predetermined circumstance.

4. A device for diagnosing misfiring according to claim 3, wherein said learning preventing means further comprises means for preventing said updating means from updating said correction coefficient in a circumstance which differs from said predetermined circumstance.

5. A device for diagnosing misfiring of an engine which has a plurality of cylinders, comprising:

a signal generator for generating a reference signal for each cylinder in synchronism with the firing action of each said cylinder; and a control circuit functioning to:

calculate a time period of said reference signal for each said cylinder;

determine whether the engine is in a fuel supplied state or a fuel cut off state;

learn a correction coefficient for each said cylinder for correcting deviations in said periods between said cylinders, based upon the period of said reference signal for each said cylinder which is obtained during the fuel cut off state;

correct the period of said reference signal for each said cylinder during the fuel supplied state of said engine according to said correction coefficient;

determine whether or not misfiring is occurring for each said cylinder, based upon said corrected period;

prevent said determining of misfiring when input of external interference to said engine has been detected;

determine if instability has occurred in said period of said reference signal during the fuel cut off period; and prevent said learning of a correction coefficient when said instability has occurred.

* * * * *